United States Patent [19]

Agarwal et al.

[11] Patent Number: 5,590,176
[45] Date of Patent: Dec. 31, 1996

[54] ARRANGEMENT FOR LOCAL TRUNK HUNTING IN A DISTRIBUTED SWITCHING SYSTEM

[75] Inventors: Anjana Agarwal, Wheaton; Chinmei C. Lee, Woodridge, both of Ill.

[73] Assignee: Lucent Technologies Inc., Murray Hill, N.J.

[21] Appl. No.: 493,779

[22] Filed: Jun. 22, 1995

Related U.S. Application Data

[63] Continuation of Ser. No. 114,020, Aug. 30, 1993, abandoned.

[51] Int. Cl.⁶ ........................................................ H04Q 7/24
[52] U.S. Cl. ............................ 379/59; 379/269; 379/221
[58] Field of Search ................................. 379/58, 59, 60, 379/220, 221, 268, 269, 271, 272, 273, 274, 63; 455/33.1, 54.1

[56] References Cited

U.S. PATENT DOCUMENTS

| | | | |
|---|---|---|---|
| 4,382,294 | 5/1983 | Beuscher et al. | 370/16 |
| 4,694,487 | 9/1987 | Chang et al. | 379/269 |
| 4,747,130 | 5/1988 | Ho | 379/269 |
| 4,974,256 | 11/1990 | Cyr et al. | 379/269 |
| 5,042,027 | 8/1991 | Takase et al. | 379/221 X |
| 5,101,451 | 3/1992 | Ash et al. | 379/221 |
| 5,119,366 | 6/1992 | Ardon et al. | 379/269 |
| 5,327,419 | 7/1994 | Clark et al. | 379/269 X |
| 5,450,482 | 9/1995 | Chen et al. | 379/220 X |

*Primary Examiner*—Curtis Kuntz
*Assistant Examiner*—William G. Trost
*Attorney, Agent, or Firm*—Jack R. Penrod

[57] ABSTRACT

A process and apparatus providing local hunting of a telecommunication trunk in response to a request coming from an external base station or switching unit. This process and apparatus by utilizing the capabilities of a local switching module or node saves communication time and processor time of the overall system. If the local trunk hunt at the local switching module is unsuccessful, the request is forwarded to a centralized processor that subsequently notifies another switching module to hunt a trunk and set-up communication with the requesting external base station or switching unit. In such a case, the centralized processor uses status table data to select a switching module that should have a trunk available to fulfill the request of the external base station or switching unit.

12 Claims, 5 Drawing Sheets

*FIG. 1*

TRUNK GROUP 62  /120

| TRUNK NO. | 1 | 2 | 3 | 4 | 5 | 6 | 7 | 8 | 9 | 10 | — | T-2 | T-1 | T |
|---|---|---|---|---|---|---|---|---|---|---|---|---|---|---|
| STATUS* | 1 | 1 | 1 | 0 | 1 | 0 | 1 | 1 | 0 | 1 | — | 0 | 1 | 0 |

TRUNK GROUP 63  /121

| TRUNK NO. | 1 | 2 | 3 | 4 | 5 | 6 | 7 | 8 | 9 | 10 | — | U-2 | U-1 | U |
|---|---|---|---|---|---|---|---|---|---|---|---|---|---|---|
| STATUS* | 0 | 0 | 1 | 1 | 0 | 1 | 1 | 0 | 1 | 0 | — | 0 | 1 | 1 |

TRUNK GROUP 64  /122

| TRUNK NO. | 1 | 2 | 3 | 4 | 5 | 6 | 7 | 8 | 9 | 10 | — | V-2 | V-1 | V |
|---|---|---|---|---|---|---|---|---|---|---|---|---|---|---|
| STATUS* | 1 | 1 | 0 | 1 | 1 | 1 | 0 | 0 | 1 | 1 | — | 1 | 0 | 0 |

\* 1 = AVAILABLE
0 = NOT AVAILABLE

TRUNK SUBGROUP 22                                              ╱500

| TRUNK NO. | 1 | 2 | 3 | 4 | 5 | 6 | – | M-2 | M-1 | M |
|---|---|---|---|---|---|---|---|---|---|---|
| STATUS | 1 | 1 | 1 | 0 | 0 | 0 | – | 0 | 1 | 1 |

*FIG. 5*

TRUNK GROUP 63

| TRUNK SUBGROUP | 22 | | | 23 | | | 24 | | |
|---|---|---|---|---|---|---|---|---|---|
| LOAD STATUS | 1 | 0 | 0 | 0 | 1 | 1 | 0 | 1 | 0 |

*FIG. 6*

ARRANGEMENT FOR LOCAL TRUNK HUNTING IN A DISTRIBUTED SWITCHING SYSTEM

This application is a continuation application Ser. No. 08/114,020, filed on Aug. 30, 1993 now abandoned.

TECHNICAL FIELD

This invention relates to distributed control switching systems for telecommunication services and, more particularly, to the control of trunk hunting within such systems.

BACKGROUND OF THE INVENTION

Large distributed switching systems for telecommunication services traditionally include an administration module and a centralized processor. The centralized processor may be located within the administration module, or located outside of the administration module, but closely coupled thereto. The centralized processor controls switching functions in response to inputs from its nodes according to a program stored in the centralized processor's memory. These nodes may include switching processors or other processors. The centralized processor controls and supervises a number of the switching modules which contain the switching processors. The switching modules are where the large distributed switching system connects to external voice and/or data units by various lines and trunks. The switching processors of the switching modules have traditionally controlled the real-time intensive tasks, such as signal processing and time slot interchanging, in response to stored programs in their memories. One example of such a system is shown in U.S. Pat. No. 4,382,294 entitled "Telephone Switching Control Arrangement," by Beuscher, et al. This patent is commonly assigned to the assignee of the present invention, and is hereby incorporated by reference.

In a known large distributed switching system, the overall control of hunting a trunk to complete a call is provided by the centralized processor. The centralized processor has centralized information regarding the availability of each trunk that terminates at the switching system: information that the distributed switching processors do not have. After the centralized processor receives a trunk request to complete a call via one of the switching processors, the centralized processor searches a bitmap representing the availability of the group of trunks that are connected to the distributed switching system at one end and another switching system or a base station system for wireless communications that is the object of the trunk request at the other end. Each bit position in the bitmap represents a specific trunk of the trunk group that terminates at the switching system. If a trunk is unavailable, i.e. busy, its corresponding bit position in its bitmap will be a binary 0 and if it is available, i.e. not busy, its corresponding bit position will be binary 1. The centralized processor then searches through the relevant bitmap using any of various search algorithms until it finds an available trunk to fulfill the request. Data associated with each trunk respectively identifies the switching module at which each trunk terminates. When an available trunk is selected, the centralized processor sends instructions to the switching module, which terminates the selected trunk. The instructions instruct the switching processor of the switching module to set up the requested connection.

A problem has arisen in switching systems having multiple switching modules as the switching modules have grown in their capacities. Because of this growth, the switching modules and their switching processors in aggregate are capable of handling more call processing tasks than the centralized processor is capable of controlling. Furthermore, the long term tendency for the switching processors, which are commercially available microprocessors, is even further growth in processing capacity. Thus, the mismatch of capacities between the centralized processor and the switching processors will tend to grow even worse. This problem is heightened in distributed switching systems that have many switching processors because a centralized processor with multiple switching processors must grow its capacity accordingly just to keep pace and not become the limiting factor of the distributed switching system. Thus, there is a need within the art to allow switching module and switching processor capacities to grow without outgrowing the capacity of the centralized processor to control and supervise the switching system functions.

It is an object of the invention to reduce the need to grow the capacity of a centralized processor in a telecommunication switching system.

It is an object of the present invention to provide a method of hunting certain trunks by the switching processor of a switching module thereby reducing the control and supervision load of the centralized processor in a distributed system.

It is another object of the invention to provide a switching system that uses the switching processor of a switching module to hunt some trunks without involving the centralized processor.

It is another object of the invention to provide a commonly accessible record of trunk availability that is updated on a real time basis.

SUMMARY OF THE INVENTION

Briefly stated in accordance with one aspect of the invention the aforementioned objects are achieved by providing a process for use in a switching system for hunting a trunk which will provide communication to a requesting station. This process includes the steps of receiving a trunk request from the requesting station at a first node of the switching system, hunting a trunk in this first node to fulfill the trunk request and, if a trunk that fulfills the trunk request is found, that trunk is assigned to connect to the requesting station. If a trunk that fulfills the trunk request is not found at the first node, the first node requests an alternate trunk from a second node of the switching system to fulfill the trunk request by selecting a trunk from the second node to the requesting station.

In accordance with another aspect of the invention, the aforementioned objects are achieved by providing a switching apparatus having a distributed architecture, including a centralized processor and switching modules with each of the switching modules having a subgroup of trunks connecting to an external switching system or base station system. Also included are means for receiving a trunk request for a destination at a switching module and means for interrogating a trunk subgroup availability table to determine if a trunk of the trunk subgroup at that switching module can fulfill the trunk request. If such a trunk of the trunk subgroup is available, the switching apparatus uses means for assigning the available trunk to the requesting station to provide the requested trunk. If such a trunk is not found at the switching module, the switching apparatus uses means for requesting an alternate trunk on a second switching module from a centralized processor and means for fulfilling the trunk request by a trunk from the trunk subgroup of the second switching module in order to provide the requested trunk.

BRIEF DESCRIPTION OF THE DRAWING

While the specification concludes with the appended claims particularly pointing out and distinctly claiming the subject matter which is regarded as the invention, it is believed that the invention will be better understood from the following description taken in conjunction with the accompanying figures in which:

DETAILED DESCRIPTION

Figure 1:
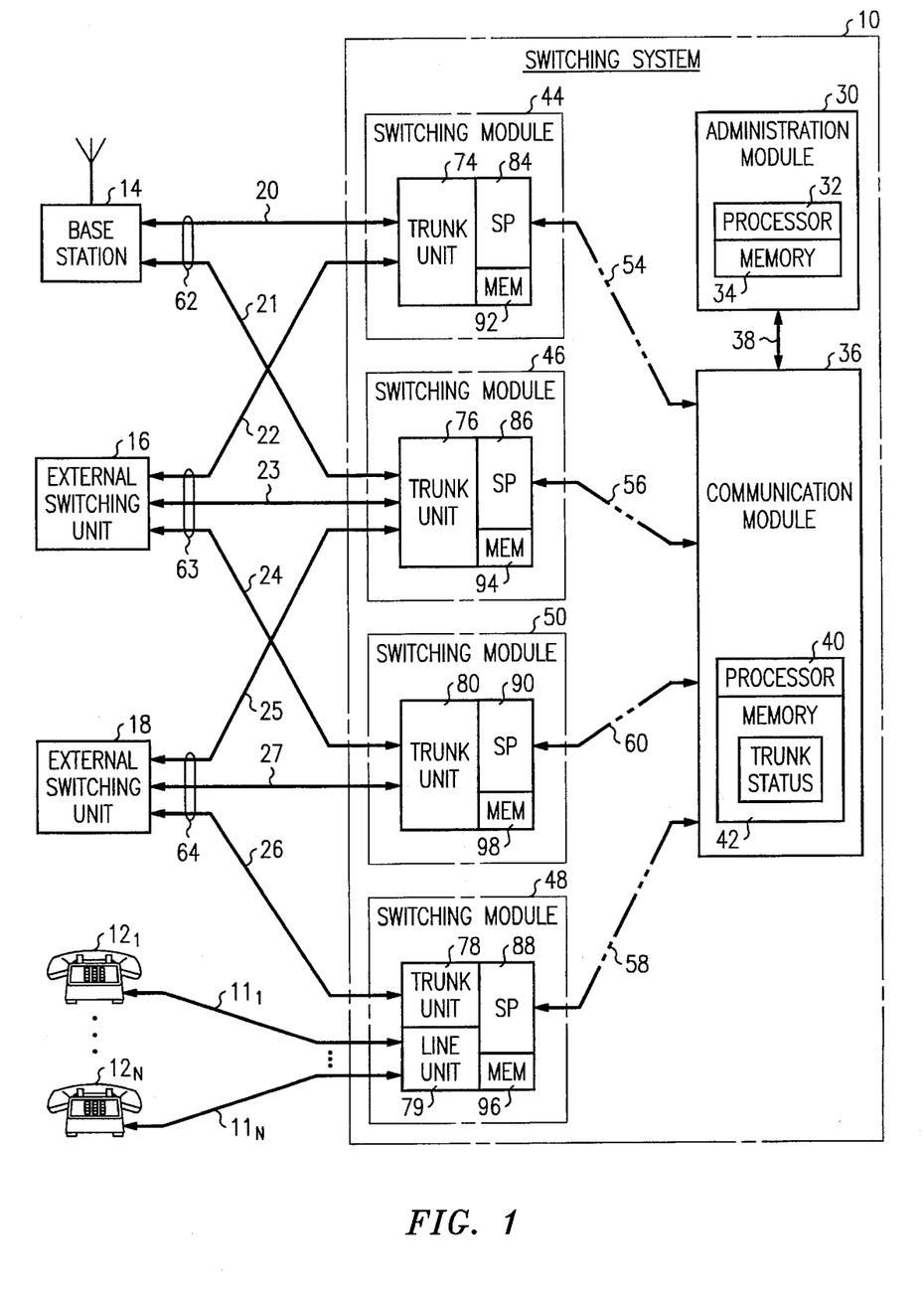
FIG. 1 is a block diagram illustrating a switching system having a distributed architecture.

Referring now to FIG. 1, a distributed switching system 10 is shown. Switching system 10 is connected via lines $11_1$–$11_N$ to telephones $12_1$–$12_N$ for normal telephone services. Switching system 10 is also connected to base station 14 and external switching units 16, 18. Base station 14 is connected to switching system 10 by trunk subgroups 20 and 21. External switching unit 16 is connected to switching system 10 by trunk subgroups 22, 23 and 24. External switching unit 18 is connected to switching system 10 by trunk subgroups 25, 26 and 27. External switching units 16, 18 may be other large switching systems, such as the 5ESS® by AT&T. Base station 14 is a station for incoming and outgoing telephone calls via cellular telephones.

Switching system 10 has a hierarchical architecture with an administration module 30 providing the highest level of control. Administration module 30 has a centralized processor 32 therein that provides administrative control of switching system 10 in accordance with an administrative program stored in a memory 34. The administrative program includes the functions of measuring and reporting all telephone call traffic through the switching system 10, collecting and recording billing information for telephone calls, evaluating the quality of the network service provided and managing the attached network of individual telephone lines and trunk lines to optimize the use of the attached network.

Administration module 30 is connected to communication module 36 by bus 38. Communication module 36 is a time multiplexed switching unit that uses space division multiplexing to provide connection for telephone calls. In the embodiment of the switching system 10 shown in FIG. 1, communication module 36 includes a communication module processor 40 and a communication module memory 42. For another embodiment shown in FIG. 1, the communication module processor 40 performs call processing and routing according to a program stored in memory 42 in cooperation with administration processor 32 and switching processor described below. Not all switching systems have communication module processors, in which case the centralized call processing functions are provided by the administration processor according programs stored therein instead of by a communication module processor. Switching modules 44, 46, 48 and 50 are connected to communication module 36 by network, control and timing (NCT) links 54, 56, 58, and 60 respectively, which may be electrical or optical in character. Only four switching modules are shown in FIG. 1, but these four are shown by way of example and are not meant to be limiting with respect to the number of switching modules that a switching system may have. Switching module 48 is connected by lines $11_1$–$11_N$ to telephones $12_1$–$12_N$ and by trunk subgroup 26 to external switching unit 18. A trunk group consists of all trunks between an external switching system, e.g. trunk group 63 consisting of subgroups 22, 23 and 24 connect external switching unit 16 and switching system 10. A trunk subgroup consists of all trunks between an external switching unit or base station and a switching system that terminate at a common switching module of such system. Thus, base station 14 is connected by trunk subgroup 20 to switching module 44 and by trunk subgroup 21 to switching module 46. Trunk subgroups 20 and 21 make up trunk group 62. External switching unit 16 is connected by trunk subgroup 22 to switching module 44, by trunk subgroup 23 to switching module 46 and by trunk subgroup 24 to switching module 50. Trunk subgroups 22, 23 and 24 make up trunk group 63. Similarly, external switching system 18 is connected by trunk subgroup 25 to switching module 46, by trunk subgroup 26 to switching module 48 and by trunk subgroup 27 to switching module 50. Trunk subgroups 25, 26 and 27 make up trunk group 64.

Switching modules 44–50 may be configured in various ways. Switching modules 44, 46 and 50 are configured with trunk units 74, 76, and 80, respectively. Switching module 48 is configured with a trunk unit 78 and a line unit 79 which provide interface to trunks and lines respectively. A switching module may be configured with multiple line units, but for brevity such a switching module is not shown. The line unit 79 provides physical connections to lines $11_1$–$11_N$ as well as the electrical and timing interfaces for telephone calls originating from or destined for telephones $12_1$–$12_N$. Similarly, trunk units 74, 76, 78 and 80 provide physical connections and electrical interfaces for trunk subgroups 20, 21, 22, 23, 24, 25, 26 and 27.

Switching modules 44, 46, 48 and 50 include switching processors 84, 86, 88, and 90 respectively. These switching processors 84, 86, 88 and 90 have memories 92, 94, 96 and 98 respectively connected thereto. The memories 92, 94, 96 and 98 contain some ROM to provide a bootstrap operating capability and RAM in which operating programs and data can be stored for execution by the switching processors 84, 86, 88 and 90. These programs are loaded into switching processors 84, 86, 88 and 90 from the administration module 30 via the communication module 36 via NCT links 54, 56, 58 and 60 respectively. The switching processors 84, 86, 88 and 90, through the operation of these programs, provide the low level timing and switching of signals between telephones $12_1$–$12_N$ and switching module 48 via lines $11_1$–$11_N$ to set up telephone calls. The switching processors 84, 86, 88 and 90 also provide low level timing and switching of signals between base station 14, external switching unit 16 and external switching unit 18 and switching modules 44, 46 and 48, 50 via trunk subgroups 20, 21, 22, 23, 24, 25, 26 and 27, respectively, to set up communications, either voice or data.

Figure 2:
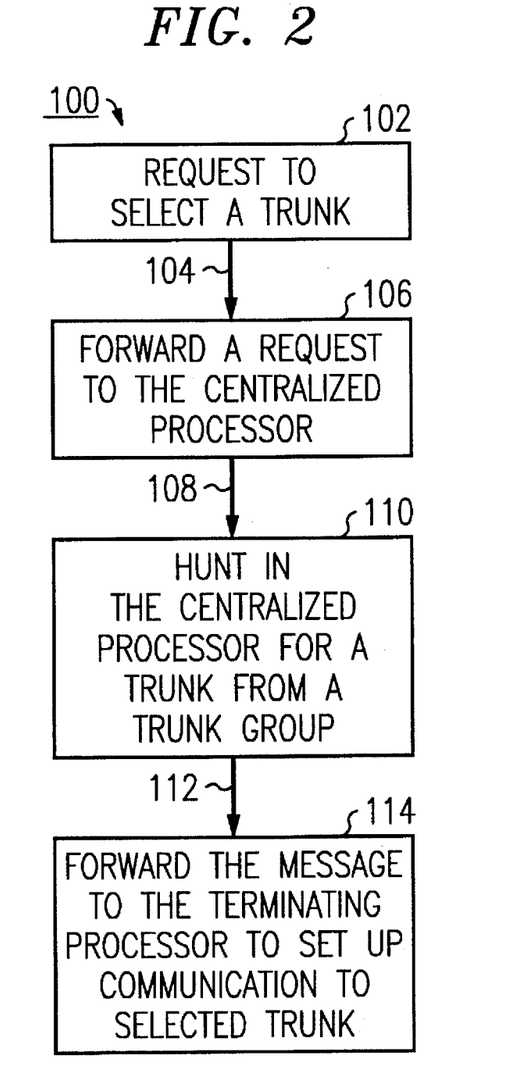
FIG. 2 is a flow diagram illustrating the previous trunk hunting method used in a switching system.

Referring now to FIGS. 1 and 2, operation of distributed switching system 10, hereinafter referred to as the switching system 10, in the known manner as previously mentioned in the Background of the Invention will be described. During such operation, the switching system 10 follows a process 100 shown in FIG. 2. Process 100 starts with action 102 which is a request by base station 14 or external switching system 16 or 18 to select or hunt a trunk to communicate via switching system 10. A request from external switching system 16 or 18 will be by an available trunk that was seized at the originating end by external switching system 16 or 18. This request itself is pan of a set of call origination data, data which also includes the identification of the incoming, seized trunk. For external switching system 16 or 18, the request is usually to hunt a trunk to a switching system that is different than, and at a distance from, the requesting system. On the other hand, a trunk hunt request from the base station 14, especially for a wireless call, may include both a request to hunt a trunk for an incoming of a call to the switching system 10 from the base station 14 as well as hunt a trunk for the outgoing path of the call. Because of the nature of wireless calls, the incoming trunk and the outgoing trunk are often both between base station 14 and switching system 10.

Each trunk hunt request is received by one of the switching modules 44, 46, 48, 50 and processed by the respective switching processor 84, 86, 88, or 90, and subsequently the process 100 proceeds along path 104 to the action 106. Action 106 is the forwarding of the trunk request to the centralized processor, i.e. an administration module processor 32, or communication module processor 40, depending on configuration. After action 106, the process 100 follows path 108 to action 110. Action 110 is the actual hunting of the trunk by the centralized processor 32 or 40.

Figure 3:
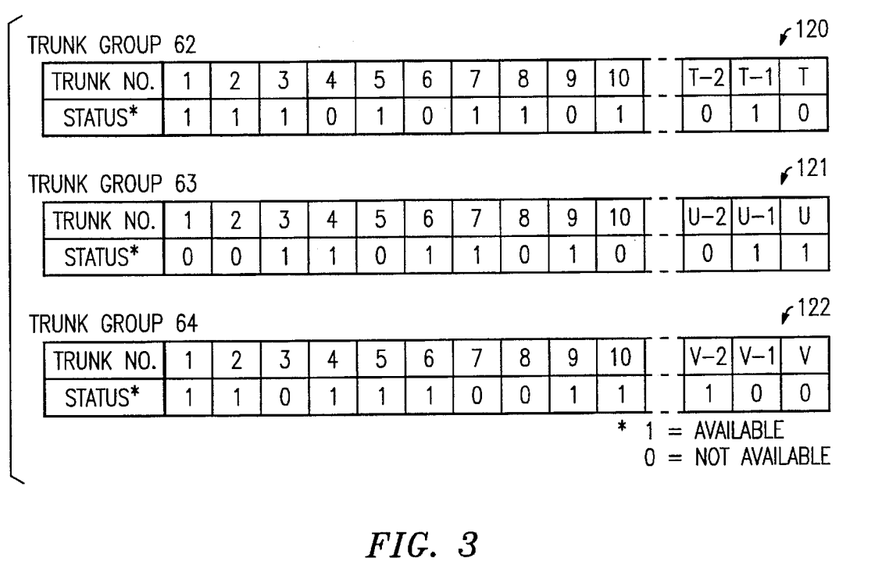
FIG. 3 illustrates trunk group status bitmaps used by known distributed switching systems.

To perform action 110, the centralized processor 32 or 40 selects the trunk group bitmap 120, 121, or 122 from a set of trunk group bitmaps 120–122, as illustrated in FIG. 3 for the trunk group between the switching system 10 and the requesting external base station 14 or external switching unit 16 or 18. Each trunk group 62, 63, and 64 corresponds to a trunk group bitmap 120, 121, and 122, respectively.

Once the trunk group bitmap has been selected, the centralized processor 32 or 40 hunts through this bitmap for an available trunk, i.e. a binary 1 in the bitmap. Various hunting strategies, such as left-to-fight, right to left, or random, may be used. Once an available trunk from the trunk group is found, the status bit for that trunk number is updated to not available, i.e., binary 0, and the data corresponding to that trunk number is used to locate the switching module 44–50 at which the selected trunk terminates and the respective switching processor 84, 86, 88 or 90 corresponding to that switching module. Once the switching module is located, the process 100 follows path 112 to action 114.

Action 114 is the forwarding of the selected trunk number to the switching module at which the selected trunk terminates and its respective switching processor, along with instructions to set-up the requested communication to the requesting external base station 14 or external switching unit 16, 18. In this known process, the switching module 44–50 that the centralized processor 32 or 40, depending on system configuration, has selected has a substantial probability of not being the same switching module that received and forwarded the trunk request in actions 102 and 104.

Figure 4:
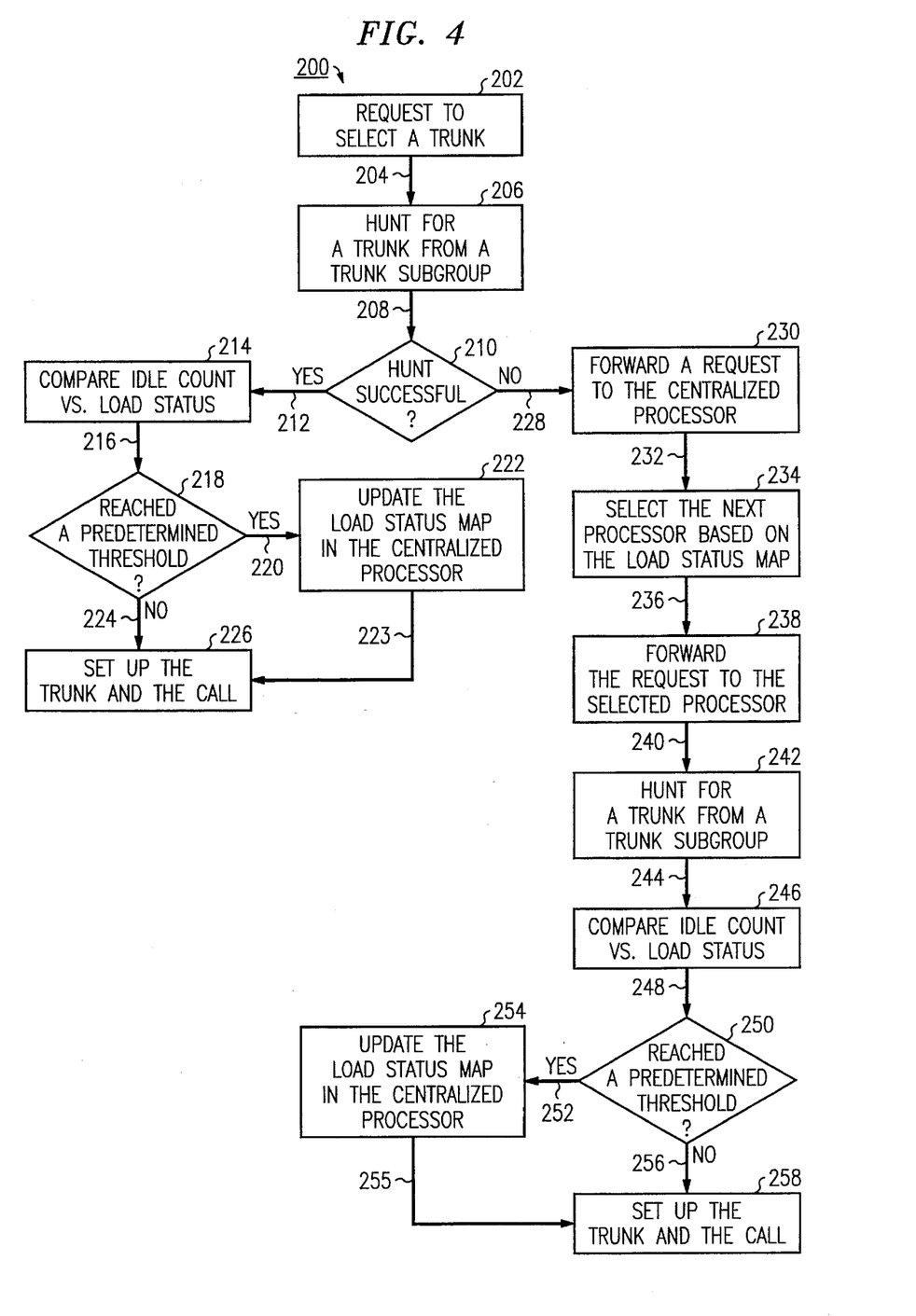
FIG. 4 is a flow diagram illustrating a trunk hunting method for use in a switching processor according to the present invention.
Figure 5:
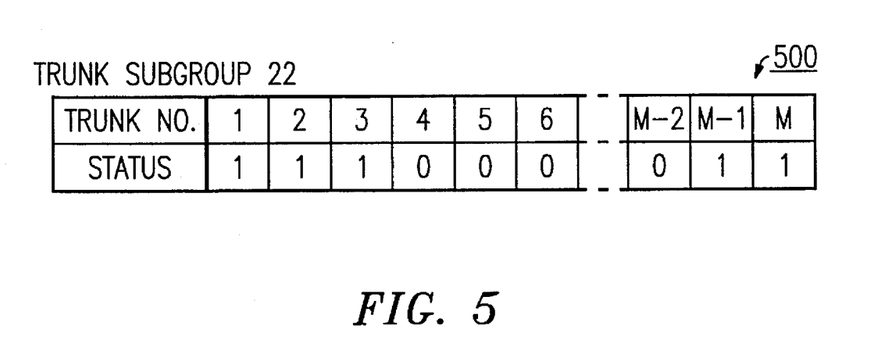
FIG. 5 illustrates trunk subgroup status bitmaps for use in the method shown in FIG. 4.

Referring now to FIGS. 1 and 4, a trunk hunting process 200 in accordance with the present invention will be described. Process 200 starts with action 202 which is a request by an external base station 14 or an external switching unit 16 or 18 to select or hunt a trunk to communicate via switching system 10. As with action 102 above, this communication may be for a call originating from a telephone set, a cellular telephone or a computer, for example, that is connected to one of the external switching units 16, 18 or base station 14. This trunk hunt request is received by one of the switching modules 44, 46, 48, 50 and processed by the respective switching processor 84, 86, 88 or 90. Unlike action 102 above, action 202 first initiates a trunk hunt by the switching processor of the switching module receiving the request. For example, if switching unit 16 sent a trunk request to switching module 44, switching processor 84 would start the trunk hunt for an outgoing trunk. After receiving a trunk hunt request, the process 200 follows path 204 to action 206. Action 206 is the actual hunting of the trunk by the switching processor 84–90. Continuing the example of the switching unit 16 that caused the request in switching processor 84 referred to above, the hunt for the outgoing trunk would be performed by switching processor 84. Switching processor 84, in order to hunt a trunk, hunts through a trunk subgroup availability bitmap in its respective memory 92. Bitmap 500, shown in FIG. 5, is one example of such a bitmap.

Bitmap 500 is similar to the trunk group bitmaps shown in FIG. 3, but trunk subgroup bitmap 500 only contains the availability status of the subgroup of incoming and outgoing trunks to the requesting base station or the subgroup of outgoing minks to the switching unit, such as unit 16. Continuing the example, trunk subgroup table 500 stores the status of trunk subgroup 22. Various hunting strategies may be used, but since the subgroup is smaller in number than the entire group, a sequential strategy might be used. Further, for trunk subgroups that may be seized at either end, complementary strategies in completing switching units, e.g., opposite sequence, would be advantageous. After the hunt strategy has been executed, process 200 follows path 208 to decision 210.

There are two possible results of action 206. Either an available trunk is found within the trunk subgroup to the requesting base station 14 or an available outgoing trunk of a trunk subgroup to another switching unit 16, 18, or all trunks of the subgroup belonging to the switching module of the requesting processor are busy. If a trunk is found, decision 210 yields an affirmative and process 200 follows path 212 to action 214. Action 214 compares the ratio of unavailable (busy) trunks in the subgroup to the number of trunks in the subgroup. Multiple load status ranges have been predetermined to aid subgroup trunk hunting. These ranges are all inclusive so the load status must be within one of the ranges. In one embodiment of the invention, the five load status ranges defined between 0 and 100 percent. The load status for each trunk subgroup is stored in its respective memory 92, 94, 96 or 98 and also in communication module processor memory 34 or 42 of the centralized processor 32, 40. After action 214, process 200 follows path 216 to decision 218. Decision 218 compares the previous load status range to the status range resulting form action 214 to determine if a load range threshold has been crossed. If a load range threshold has been crossed, process 200 follows path 220 to action 222, otherwise process 200 follows path 224.

Figure 6:
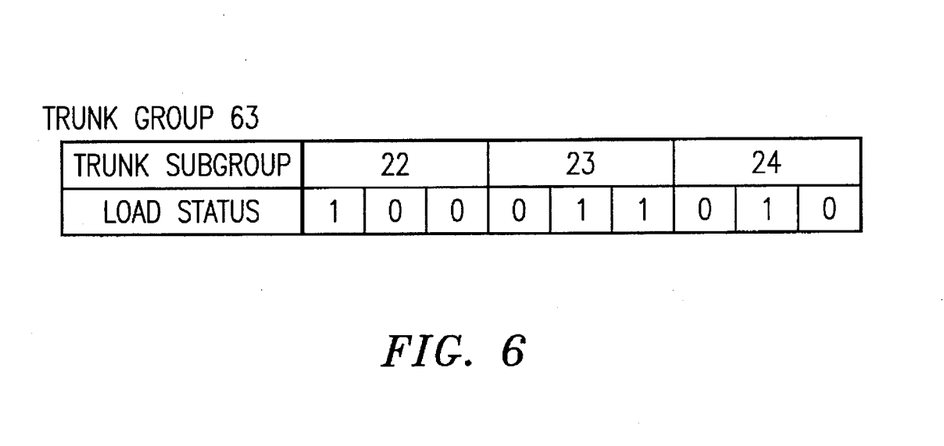
FIG. 6 illustrates a trunk availability control bits for trunk subgroups of a trunk.

After a load range threshold has been crossed, action 222 sends a data message to that effect to centralized processor 32 or 40. This message is used to update a load status control bits of the trunk subgroup that is stored in memory 34 or 42 of the centralized processor 32, or 40. An example of load status control bits for trunk group 63 is shown in FIG. 6. Load status ranges could be kept for each trunk subgroup by three up to eight different binary bits of memory 34 or 42 per trunk subgroup. Up to eight different status ranges can be kept for each trunk subgroup. The major use for storing this information in memory 34 or 42 occurs when the switching processor of the switching module receiving the request does not have a trunk available as explained below.

After action 222 process 200 follows path 223 to action 226 which is the setting up of the trunk connections and call connections within the switching module under the control of the switching processor. Similarly, after a decision that no centralized processor updating is needed at decision 218, the process 200 follows path 224 directly to the trunk connecting action 226.

If the result of the trunk hunt by switching processor of the switching module receiving the request is not successful, from decision 210 the process 200 follows path 228 to action 230. Action 230 is a forwarding of the trunk request from the receiving switching module 44–50 and its respective switching processor 84–90 to the centralized processor, such as administration module processor 32 or communications module processor 40, because the switching processor of the request receiving switching module did not successfully find a trunk to fulfill that request. After the trunk request is forwarded, process 200 follows path 232 to action 234.

Action 234 is performed by the centralized processor 32 or 40. The forwarded request contains the identification data of the requesting base station or the outgoing trunk subgroup to the other switching unit, such as switching unit 16, that the centralized processor uses to find the trunk groups that are physically connected to the requesting entity. Within each trunk group, the trunk subgroups are managed together. Associated with each trunk subgroup is a respective load status and a respective switching module identification. The centralized processor examines the load statuses and finds a trunk subgroup that could have at least one trunk available according to its load status, preferably a trunk subgroup with a high trunk availability status. Next, the process 200 follows path 236 to action 238. Action 238 is a forwarding of the trunk request by the centralized processor to the switching processor 84, 86, 88 or 90 of the respective switching module 44, 46, 48 or 50 that is likely to have an available trunk to fulfill the request. After action 238, the process 200 follows path 240 to action 42.

Action 242 is an action by the switching processor 84, 86, 88, or 90 of the selected switching module 44, 46, 48 or 50 to hunt a trunk from the selected trunk subgroup 20, 21, 22, 23, 24, 25, 26 or 27. Actions 238 and 242 correspond to actions 202 and 206 only actions 238 and 242 are performed by a second switching processor. The hunt by this second switching processor is likely to be successful but there are circumstances that could lead to an unsuccessful hunt. Examples of such circumstances are the assignment of the last available trunk by the second switching processor before the centralized processor has been notified, the seizing of all supposedly available trunks at their remote ends by external switching systems before the centralized processor is notified, and the possibility that trunk units at which the available trunks terminate are taken out of service by an external switching system at a far end before the centralized processor has been notified. After a trunk has been found, the process 200 follows path 244 to action 246. Action 246 is an action by the second switching processor 84, 86, 88 or 90 to change the status of the found trunk from idle to active and to determine an updated load status of its respective trunk subgroup.

Referring now to FIGS. 1 and 5, further details of trunk subgroup status table 500 will be described. Each of the switching processors 84, 86, 88 and 90 has a respective trunk subgroup availability bitmap similar to trunk subgroup availability bitmap 500. These bitmaps are stored in switching module memories 92, 94, 96 and 98 respectively.

The trunk subgroup availability bitmap 500 has M locations, each location represents a respective trunk of the trunk subgroup. Each of the M locations has a status bit associated therewith. A status bit of binary 0 indicates the trunk represented thereby is not available (e.g. busy) and a status bit of binary 1 indicates that the trunk represented thereby is available. To hunt a trunk, a switching processor first hunts through its respective trunk subgroup availability bitmap to find a binary 1 state. After finding a binary 1 state, the switching processor locates the available trunk corresponding to that binary 1 state location and sets up the communication path.

The trunk subgroup availability bitmaps provide their respective switching processors 84–90 with the availability information necessary to perform a trunk hunt at the switching module level, also called the switching node level, without referring to the centralized control of the distributed switching system 10.

Referring again to FIGS. 1 and 4, action 246 determines the ratio of unavailable, e.g. busy, trunks in the subgroup and the total number of trunks in the subgroup. After action 246, process 200 follows path 248 to decision 250. Decision 250 compares the previous load status range to the status range resulting from action 246 to determine if a load range threshold has be crossed. If a load range threshold has been crossed, process 200 follows path 252 to action 254, otherwise process 200 follows path 256.

After a load range threshold is crossed, action 254 sends a data message to that effect to centralized processor 34 or 40. This message is used to update a load status bitmap of the trunk subgroup that is stored in memory 34 or 42, such as shown in FIG. 6 mentioned previously.

After action 254 process 200 follows path 255 to action 258 which is the setting up of the trunk connections and call connections within the switching module under the control of the switching processor. On the other hand, if at decision 250, the result is that no centralized processor updating is needed, the process 200 follows path 256 directly to the trunk connecting action 258. In either case, action 258 fulfills the trunk request on the second switching processor from a second trunk subgroup when trunk hunting by the switching processor of the switching module receiving the trunk request is unable to fulfill the trunk request. Thus, action 258 sets up and completes the connection for the communication.

The process 200 has the advantage of allowing a local trunk hunt by the switching processor of each switching module that receives a trunk request. This process relieves the centralized processor of a substantial portion of the trunk hunting function and the processing time occupied thereby. This leaves the centralized processor with more processing time to use for other communication tasks, thereby increasing the effective throughput of the switching system 10 as a whole. Further by having the switching processors provide most of the trunk hunting, the trunk hunting related communications load on the buses between the centralized processor and the switching processors is decreased, thereby increasing the effective bandwidth of those buses for other communications. Similarly, because local trunk hunting decreases switching processor-to-switching processor communications occasioned by trunk requests managed by the centralized processor, the communication load among the switching processors is decreased. Likewise, since more requests will be processed within each switching module, the processing time occupied by exchanging data and messages with a second switching module will be reduced. The result of all of these decreases is a reduction of trunk assignment times and call setup delays for the switching system 10.

Another advantage of operating switching system 10 according to process 200 is that local trunk hunting provides a higher likelihood of obtaining a trunk of a preferred switching module. This advantage may include obtaining a trunk in the switching module that has the data of the subscriber that occasioned the trunk request, as in the case of a wireless call setup, and obtaining a trunk for a call in a switching module which has the call in its control, e.g. in the case of a wireless call handover. Thus, there are advantages to local trunk hunting within a distributed switching system.

Thus, it will now be understood that there has been disclosed a process and apparatus for local trunk hunting within a distributed switching system. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

We claim:

1. A switching system having a distributed architecture including a centralized processor, a communication module and a plurality of switching modules with each of the switching modules having a local processor and a subgroup of trunks connecting to another switching system, comprising:

means for receiving a trunk request for a destination at one local processor of one of the plurality of switching modules;

means for interrogating a trunk subgroup availability bitmap in said local processor to determine if a trunk of the trunk subgroup can fulfill the trunk request and if such a trunk of the trunk subgroup is available;

means for assigning the available trunk to the requesting station if a trunk of the subgroup that fulfills the trunk request is available;

means for requesting an alternate one of the plurality of switching modules to assign an alternate trunk on an alternate local processor from the centralized processor if a trunk of the subgroup that fulfills the trunk request is not available;

means for fulfilling the trunk request by a trunk from the trunk subgroup of the alternate switching module;

means for storing a plurality of at least three trunk loading statuses in each trunk subgroup availability bitmap for each switching module in the centralized processor; and wherein said centralized processor has an trunk subgroup availability bitmap that is updated by each switching module if a threshold of one of a plurality of trunk loading statuses of its respective switching module is exceeded.

2. The switching system according to claim 1, wherein the trunk request is initially transmitted to the switching module from a base station system for originating a telephone call from a cellular telephone.

3. The switching system according to claim 1, wherein the trunk request is requesting a trunk from the switching module to complete a telephone call to a base station system for cellular communications that is also connected to the switching module.

4. The switching system according to claim 2, wherein the trunk request is fulfilled by a trunk from the subgroup of the alternate switching module if the switching module does not have a trunk available and the alternate switching module does have a trunk available.

5. The switching system according to claim 3, wherein the trunk request is fulfilled by a trunk from the subgroup of the alternate switching module if the switching module does not have a trunk available and the alternate switching module does have a trunk available.

6. For use in a switching system with distributed architecture, a process for providing a trunk to a requesting system comprising the steps of:

receiving a trunk request for a destination at a first switching module;

interrogating a trunk subgroup availability bitmap within the first switching module to determine if a trunk of the trunk subgroup can fulfill the trunk request and if such a trunk of the trunk subgroup is available;

if a trunk of the subgroup to fulfill the trunk request is available, assigning the available trunk to the requesting system;

if a trunk of the subgroup to fulfill the trunk request is not available, requesting a centralized processor to assign a second switching module to hunt a trunk from a trunk subgroup of the second switching module;

fulfilling the trunk request by a trunk from the trunk subgroup of the second switching module to the requesting system;

determining a load status of the subgroup by taking a ratio of a number of busy trunks to a number of trunks in the subgroup; and determining if one of a plurality of at least three load statuses thresholds has been crossed and if a threshold has been crossed forwarding the present load status to the centralized processor.

7. For use in a switching system with distributed architecture, a process for providing a trunk to a requesting system comprising the steps of:

receiving a trunk request for a destination at a first switching module;

interrogating a trunk subgroup availability bitmap within the first switching module to determine if a trunk of the trunk subgroup can fulfill the trunk request and if such a trunk or the trunk subgroup is available;

if a trunk of the subgroup to fulfill the trunk request is available, connecting the available trunk to the requesting system;

if a trunk of the subgroup to fulfill the trunk request is not available, requesting a centralized processor to assign a second switching module to hunt a trunk from a trunk subgroup of the second switching module;

fulfilling the trunk request by a trunk from the trunk subgroup of the second switching module to the requesting system;

determining a load status of the subgroup of the second switching module by taking a ratio of a number of busy trunks to a number of trunks in the subgroup; and determining if one of a plurality of at least three load statuses thresholds has been crossed and if a threshold has been crossed forwarding the present load status to the centralized processor.

8. A switching system having a hierarchical distributed architecture including a higher level centralized processor, a higher level communication module and a plurality of lower level switching modules with each of the switching modules having a local processor and a subgroup of trunks connecting to another switching system, comprising:

means for receiving a trunk request for a destination at one local processor of one of the plurality of switching modules;

means for interrogating a trunk subgroup availability bitmap in said local processor to determine if a trunk of the trunk subgroup can fulfill the trunk request and if such a trunk of the trunk subgroup is available;

means for assigning the available trunk to the requesting station if a trunk of the subgroup that fulfills the trunk request is available;

means for requesting an alternate one of the plurality of switching modules to assign an alternate trunk on an alternate local processor from the centralized processor if a trunk of the subgroup that fulfills the trunk request is not available;

means for fulfilling the trunk request by a trunk from the trunk subgroup of the alternate switching module; and means for storing a plurality of at least three trunk loading statuses in each trunk subgroup availability bitmap for each switching module in the centralized processor;

wherein said centralized processor has an trunk subgroup availability bitmap that is updated by each switching module if a threshold of one of a plurality of trunk loading statuses of its respective switching module is exceeded.

9. The switching system according to claim 8, wherein the trunk request is initially transmitted to the switching module from a base station system for originating a telephone call from a cellular telephone.

10. The switching system according to claim 9, wherein the trunk request is fulfilled by a trunk from the subgroup of the alternate switching module if the switching module does not have a trunk available and the alternate switching module does have a trunk available.

11. The switching system according to claim 8, wherein the trunk request is requesting a trunk from the switching module to complete a telephone call to a base station system for cellular communications that is also connected to the switching module.

12. The switching system according to claim 11, wherein the trunk request is fulfilled by a trunk from the subgroup of the alternate switching module if the switching module does not have a trunk available and the alternate switching module does have a trunk available.

* * * * *